350-432

SR

XR 4,158,222

TX 4094 H

TX 4074 C

United States Patent [19]

Cook

[11] 4,158,222

[45] Jun. 12, 1979

[54] LIMITED VISIBILITY SIGNAL DEVICE

[75] Inventor: Richard D. Cook, Williamson, Tex.

[73] Assignee: Gulf & Western Industries, Inc., New York, N.Y.

[21] Appl. No.: 836,534

[22] Filed: Sep. 26, 1977

[51] Int. Cl.[2] .......................... F21Q 3/00; B60Q 1/00; F21V 5/08; F21V 13/04; F21M 1/00

[52] U.S. Cl. .................................... 362/269; 340/84; 340/383; 350/211; 362/287; 362/309; 362/310; 362/311; 362/328; 362/331; 362/333; 362/334

[58] Field of Search ............... 362/269, 282, 285, 287, 362/290, 291, 292, 296, 307, 308, 309, 310, 311, 326, 327, 328, 329, 331, 332, 333, 334; 340/84, 383; 350/211

[56] References Cited

U.S. PATENT DOCUMENTS

| | | | |
|---|---|---|---|
| 1,489,697 | 4/1924 | Carson | 362/333 |
| 1,711,479 | 4/1929 | Halvorson, Jr. | 340/84 |
| 1,788,936 | 1/1931 | Wood | 362/333 |
| 2,044,224 | 6/1936 | Peple, Jr. | 362/309 |
| 2,551,954 | 5/1951 | Lehman | 362/333 |
| 2,590,192 | 3/1952 | Logan | 362/331 |
| 2,827,831 | 3/1958 | Elion et al. | 362/308 |
| 2,853,599 | 9/1958 | Kliegl | 362/333 |
| 3,119,894 | 1/1964 | Nagel et al. | 362/334 |
| 3,457,400 | 7/1969 | Appeldorn | 362/311 |
| 3,678,458 | 7/1972 | Ljungkull et al. | 340/383 |
| 3,851,165 | 11/1974 | Deck et al. | 362/296 |

FOREIGN PATENT DOCUMENTS

| | | | |
|---|---|---|---|
| 408419 | 4/1934 | United Kingdom | 362/331 |
| 414726 | 8/1934 | United Kingdom | 362/331 |
| 423843 | 2/1935 | United Kingdom | 362/311 |
| 452011 | 8/1936 | United Kingdom | 362/309 |

*Primary Examiner*—Benjamin R. Padgett
*Attorney, Agent, or Firm*—Meyer, Tilberry & Body

[57] ABSTRACT

A limited visibility signal device is disclosed which includes a housing, a source of illumination within the housing, a light directing lens at the outer end of the housing, and a light collimating arrangement between the source of illumination and light directing lens to intensify and directionally control light delivered to the light directing lens. The light directing lens includes an inner side provided with parallel lenticular elements extending thereacross and having first outer surface portions parallel to the lens axis and second outer surface portions of circular contour. The light directing lens further includes an outer side provided with parallel adjacent lenticular elements extending thereacross perpendicular to the elements on the inner side of the lens and alternate ones of which are of convex and concave contour with respect to the lens axis. The device emits light in a pattern defining a longitudinal section of a cone which includes a plane of light parallel to the lens axis and laterally outwardly of which the emitted light from the device is not visible. Preferably, light collimation is provided by a Fresnel lens within the housing adjacent the light directing lens.

22 Claims, 8 Drawing Figures

FIG. 5
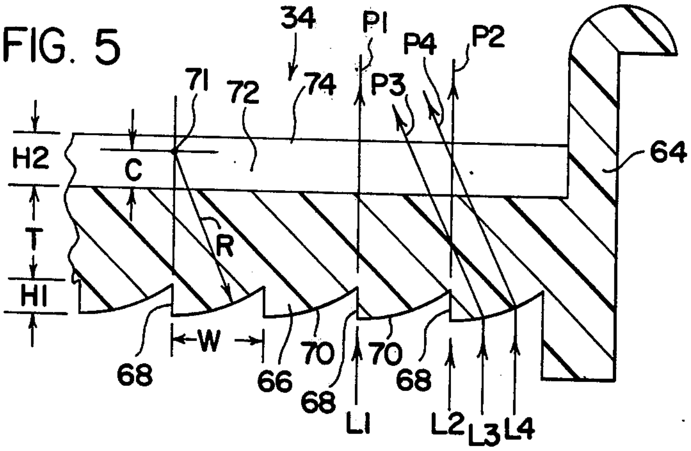
FIG. 6
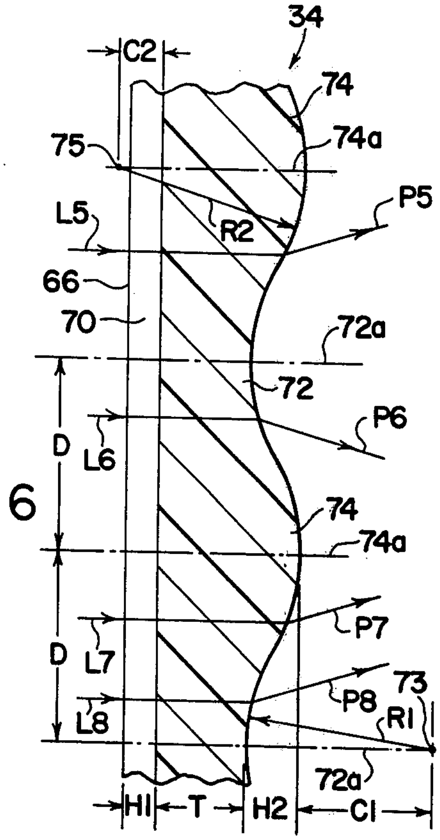
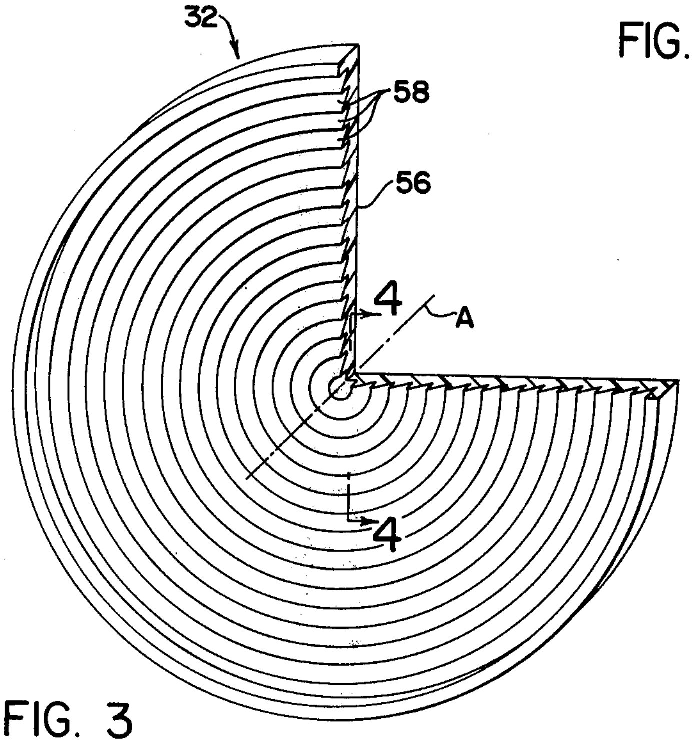
FIG. 3
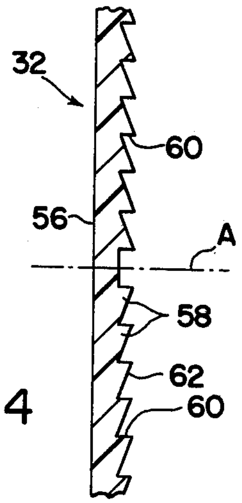
FIG. 4

LIMITED VISIBILITY SIGNAL DEVICE

This invention relates to the art of signal devices and, more particularly, to a limited visibility signal device.

The present invention finds particular utility in connection with traffic controlling signal devices such as those employed at an intersection and in a turn lane associated with the intersection. Accordingly, the invention will be described in detail in conjunction with such use but, as will become apparent hereinafter, the limited visibility aspects of the signal device advantageously enable use thereof for a wide variety of control or signal purposes.

It has long been a problem in conjunction with traffic signals at intersections that drivers of vehicles approaching the intersection may be confused by several factors including the number of signal lights visible to him, and different colors of the lights for the traffic lanes approaching the intersection. For example, at a given intersection there may be a turn lane in which the light is red and one or more through lanes having corresponding lane lights which are green. Thus, a turn lane light which is of no concern to a driver proceeding through the intersection is nonetheless visible to him a considerable distance prior to his reaching the intersection and is, at least to some extent, distracting to the driver. Moreover, if several succeeding intersections are closely spaced apart and provided with a plurality of signal lights, these additional lights can also be confusing and distracting to the vehicle operator as he approaches a preceding intersection.

Accordingly, it becomes desirable to provide a signal device having a light directing capability which enables selective control of the direction of light and the visibility thereof with respect to a vehicle operator in a given traffic lane. In this respect, for example, such light directing capability would enable the provision of a signal light for a turn lane which would not be visible to a vehicle operator approaching an intersection until such time as he maneuvered his vehicle into the turn lane from an adjacent through lane at the intersection. Thus, vehicle operators intending to proceed through the intersection would not be distracted or confused by observing an additional traffic light controlling the turn lane. Similarly, such a light directing capability would enable the provision of a traffic signal at one intersection which would not be visible to a vehicle operator until the operator has passed through the preceding intersection. Thus, the vehicle operator sees only that signal light or lights at the intersection he is approaching or passing through.

The present invention advantageously provides a limited visibility signal device having the foregoing capabilities. Basically, a traffic signal device in accordance with the present invention comprises a source of illumination, an arrangement for collimating light from the source, and a light directing lens structure. The light directing lens effectively provides for light to be directed forwardly of the lens parallel to the lens axis and laterally outward in one direction relative to the lens axis, while substantially avoiding lateral outward deflection of light in the opposite direction relative to the lens axis. This, in effect, provides a blocking plane generally parallel to the lens axis and laterally spaced from the axis such that light emanating from the signal device is not visible until such time as a person's line of sight is parallel to the lens axis and between the lens axis and the blocking plane. By collimating light within the traffic signal in the direction from the source of illumination to the light directing lens, the light advantageously is intensified and directed toward the lens substantially parallel to the lens axis. This advantageously maximizes the intensity of light emanating from the device and minimizes lateral light deflection in the direction toward the blocking plane. The source of illumination can be a bulb and reflector arrangement, for example, and collimation preferably is achieved by means of a Fresnel lens between the light source and light directing lens. The light directing lens includes lenticular elements on one side thereof which are structured to direct light forwardly of the lens in planes parallel to the lens axis, to establish the blocking plane referred to above, and to direct light in a common direction laterally of the lens axis. Preferably, the opposite side of the light directing lens is provided with lenticular elements which are structured to direct light in laterally opposite directions in the planes parallel to the lens axis and in directions away from the blocking plane and laterally opposite with respect to the common direction.

In use of the signal device in a turn lane at an intersection, for example, the signal device is mounted with the blocking plane facing and parallel to an adjacent through lane at the intersection. Accordingly, a vehicle operator in the through lane does not see the turn signal unless or until he manuevers his vehicle into the turn lane so that his line of vision passes through the blocking plane. As a further example, the signal device can be mounted above a through lane at an intersection with the blocking plane disposed vertically above the lens axis. By inclining the lens axis and thus the blocking plane downwardly toward the through lane, a vehicle operator approaching the intersection does not see the signal light until such time as his line of vision passes through the inclined blocking plane. It will be appreciated, therefore, that the incline of the lens axis can be such that the signal light is not visible to an approaching vehicle operator until he passes through a preceding intersection, thus avoiding the possibility of confusion or distraction to the vehicle driver as he approaches and passes through the preceding intersection.

By intensifying and controlling lateral spread of the light emanating from the signal device, the light laterally inwardly of the blocking plane is visible from a considerable distance away from the signal device. This, in conjunction with the blocking plane, enhances use of the signal device for long range limited visibility control functions. In this respect, for example, the signal device can be employed in conjunction with air traffic approach to an airport landing strip to provide a signal visible to an approaching aircraft only when the latter passes through the blocking plane. It will be appreciated that, in connection with such use, the blocking plane can be oriented either vertically or horizontally to provide a visual indication to the approaching aircraft that it is within or outside lateral, upper and/or lower limits of an approach lane to the landing strip, which limits would be defined by the angle of the lens axis and thus the blocking plane with reference to horizontal or vertical.

In accordance with another aspect of the present invention, the source of illumination, collimating arrangement and light directing lens are mounted in a housing and have axes common with one another and with the housing. The housing is supported for universal pivotal movement about a fixed point on the common axis and for rotation about the common axis. Accordingly, the signal device can be easily and readily adjusted to position the blocking plane circumferentially with respect to the common axis and to angularly position the axis and thus the blocking plane relative to horizontal and vertical.

Accordingly, it is an outstanding object of the present invention to provide an improved limited visibility signal light device.

A further object is the provision of a signal device of the foregoing character including a light directing lens effective to establish a blocking plane extending forwardly of the device and generally parallel to the lens axis, and laterally outwardly from which plane light emanating from the device is not visible.

Yet a further object is the provision of a signal device of the foregoing character in which the light directing lens provides for lateral deflection of light passing therethrough in a common direction with respect to the lens axis and laterally away from the blocking plane, and for deflection of light in laterally opposite directions with respect to the common direction.

Another object is the provision of a signal device of the foregoing character comprising a source of illumination and a collimating arrangement to intensify and control the direction of light to the light directing lens so as to minimize lateral light deflection in the direction toward the blocking plane and to maximize the intensity of light emanating from the device.

Yet another object is the provision of a signal device of the foregoing character which provides high intensity light emanation enabling long distance visibility of the signal device laterally within the blocking plane.

Still another object is the provision of a signal device of the foregoing character which is versatile in use, economical to manufacture, readily adjustable to control the direction of the pattern of light emanating therefrom, and which is easily assembled and disassembled for purposes of maintenance and/or replacement of parts.

The foregoing objects, and others, will in part be obvious and in part pointed out more fully hereinafter in conjunction with the written description of a preferred embodiment of the invention shown in the accompanying drawings in which:

FIG. 3 is a perspective view, partially in section, of the collimating lens of the signal device as seen along line 3—3 in FIG. 1;

FIG. 4 is a detail sectional view of the collimating lens as seen along line 4—4 in FIG. 3;

FIG. 5 is a detail sectional view of the light directing lens as seen along line 5—5 in FIG. 2;

FIG. 6 is a detail sectional view of the light directing lens as seen along line 6—6 in FIG. 2;

Figure 1:
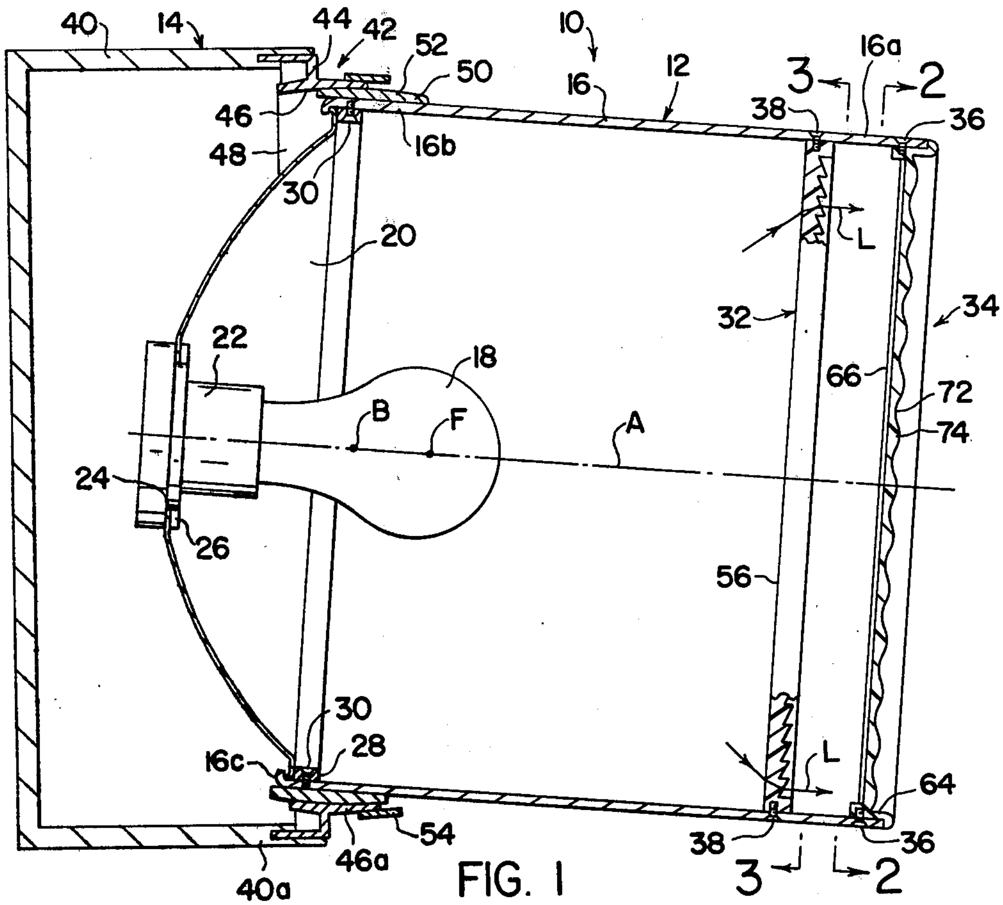
FIG. 1 is a sectional elevation view of a signal device made in accordance with the present invention.

Referring now in greater detail to the drawings wherein the showings are for the purpose of illustrating a preferred embodiment of the invention only and not for the purpose of limiting the invention, a limited visibility signal device 10 is illustrated which, as shown in FIG. 1, includes a light source and optics assembly 12 and a mounting and support assembly 14. Light source and optics assembly 12 is comprised of a tubular housing 16 having an axis A and outer and inner end portions 16*a* and 16*b*, respectively. Housing 16 supports a source of illumination at inner end 16*b* thereof which in the embodiment disclosed is defined by a bulb 18 and a cylinderical reflector 20 coaxial with the housing. Bulb 18 is removably received in a socket 22 which is suitably interengaged with reflector 20 for removal therefrom. In this respect for example, and in a manner well known in the field of signal devices, reflector 20 can be provided with a central opening 24 having radially outwardly extending slots, not shown, circumferentially spaced apart thereabout to receive corresponding radial projections 26 on the base of socket 22. This arrangement provides a bayonet type interconnection by which socket 22 and projections 26 can be inserted through reflector opening 24 and the radial slots and then rotated to interengage projections 26 with the inner surface of the reflector adjacent opening 24. Other mounting arrangements could of course be employed to support the bulb relative to the reflector and housing 16. Reflector 20 is removably mounted in housing 16 and, in the embodiment shown, this is achieved by axially capturing the peripheral edge of the reflector between a radially inwardly extending flange portion 16*c* on the housing and a mounting ring 28 which is removably connected to housing 16 such as by means of threaded fasteners 30.

Housing 16 further supports a collimating lens 32 and a light directing lens 34, each of which lens is described in detail hereinafter. Light directing lens 34 is removably mounted on outer end 16*a* of the housing such as by means of threaded fasteners 36, and collimating lens 32 is spaced axially inwardly from lens 34 and is removably mounted in the housing such as by means of threaded fasteners 38. The planes of lens 32 and 34 are parallel to one another and perpendicular to housing axis A, and the lens axes are coaxial with the housing axis. Accordingly, it will be appreciated that axis A provides a common axis for housing 16, bulb 18, reflector 20 and lens 32 and 34.

Mounting and support assembly 14 includes a box-like housing 40 for receiving and enclosing the necessary wires and connections, not illustrated, for bulb 18. Housing 40 also provides a support member by which the signal device can be mounted as necessary in conjunction with an intended use thereof. Mounting and support assembly 14 further includes a coupling assembly 42 by which light source and optics assembly 12 is removably interengaged with housing 40 and supported for pivotal and rotational movement relative to the housing. Coupling assembly 42 includes a mounting member 44 which, as set forth more fully hereinafter, is detachably secured to the open outer end 40*a* of housing 40. Mounting member 44 includes an axially extending circular flange 46 providing an opening through the mounting member, and flange 46 has a spherical inner surface 48 surrounding inner end 16*b* of housing 16. Inner end 16*b* of housing 16 is provided on the exterior surface thereof with a ring member 50 suitably secured to the housing such as by a shrink fit, and ring 50 has a spherical outer surface 52 interengaging spherical surface 48 of mounting member 44. Flange 46 of mounting member 44 has an axially outer portion 46*a*, and a securing ring 54 wedgingly engages the outer surface of flange portion 46*a* to prevent axial separation of ring 50 and thus housing 16 from mounting member 44. Securing ring 54 is removably interconnected with mounting member 44 in the manner set forth more fully hereinafter. It will be appreciated that coupling assembly 42 enables light source and optics assembly 12 to be universally pivoted relative to box 40 about a fixed point B on axis A defined by a plane through axis A perpendicular thereto and bisecting spherical surface 52. It will be further appreciated that coupling assembly 42 enables assembly 12 to be rotated about axis A relative to housing 40. As will become more apparent hereinafter, this adjustability facilitates adjusting the signal device in accordance with the requirements for a particular use thereof.

In accordance with the present invention, light from bulb 18 and reflector 20 is collimated so that light beams directed towards light directing lens 34 in the direction of arrows L in FIG. 1 are substantially parallel to axis A and thus perpendicular to the plane of lens 34. This directional control of light beams impinging upon the inner side of light directing lens 34 is desirable to maximize the intensity of light and to minimize beam divergence forwardly of light directing lens 34 such as would be promoted by beam divergence of light approaching the inner side of the light directing lens. This is of particular importance in connection with establishing a blocking plane in the pattern of light emanating from the signal device, as described in detail hereinafter, and in maintaining the blocking plane parallel to the axis of the light directing lens. Accordingly, a light collimating arrangement is provided within housing 16 between the light source and light directing lens 34 to maximize the intensity of light impinging on the inner surface of light directing lens and to control the light beams impinging on the inner surface of the light directing lens to minimize beam divergence. While many collimating arrangements could be employed, such as light pipes or closely spaced apart parallel plates, it has been found that the desired results are best achieved when the collimator is a Fresnel lens such as lens 32 referred to hereinabove. In this respect, a Fresnel lens properly associated with bulb 18 and reflector 20 enables controlling beam divergence to about 1° relative to the lens axis. As is well known, and as shown in FIGS. 3 and 4 of the drawing. Fresnel lens 32 has a planar side 56 and a plurality of circular lenticular elements 58 on the opposite side and concentric with the axis of the lens. Accordingly, the lenticular element rings are of decreasing diameter radially inwardly of the lens, and the individual rings in cross section have axially extending surfaces 60 parallel to the lens axis and radially extending flat surfaces 62 inclined with respect to the lens axis. Further, the axial dimensions of surfaces 60 of the elements are the same, and the radial dimensions of the surfaces 62 of the elements are the same.

Fresnel lens 32 is positioned in housing 16 forwardly from filament F of bulb 18 a distance corresponding to the focal length of the Fresnel lens. Further, bulb 18 is located for filament F thereof to be spaced forwardly from reflector 20 a distance equal to twice the focal length of the reflector. This relationship provides for light beams from the bulb to image back on themselves and thus impinge on the inner side 56 of Fresnel lens 32 in directions diverging with respect to axis A, as shown in FIG. 1. In passing through the Fresnel lens the light beams are deflected by lenticular elements 58 to a direction forwardly and parallel to axis A as represented by light beam L in FIG. 1. Accordingly, all of the rays from the light source are properly directed to yield a collimated beam at the output side of the Fresnel lens and thus at the inner side of light directing lens 34.

Figure 2:
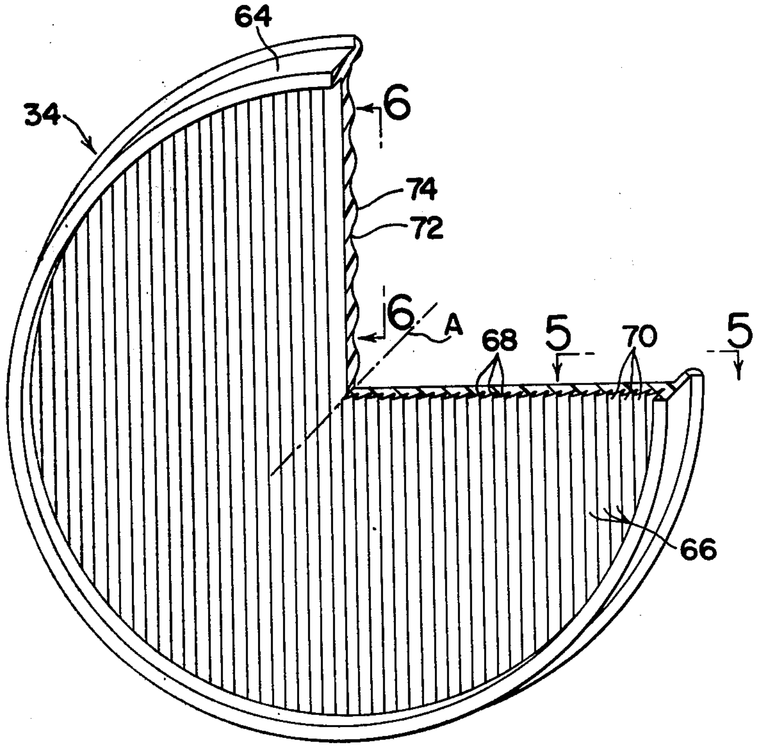
FIG. 2 is a perspective view, partially in section, of the light directing lens of the device as seen along line 2—2 in FIG. 1.

As will be seen in FIG. 1, 2, 5 and 6 of the drawing, light directing lens 34 has a circular periphery defined by a peripherally continuous mounting rim or flange 64 and, when mounted on the outer end of housing 16, the lens has inner and outer sides with respect to the housing. The inner side of lens 34 is provided with a plurality of lenticular elements 66 each of which extends uninterruptedly across the lens between rim 64. All of the lenticular elements 66 are parallel to one another and are of a cross-sectional contour and orientation which provides for light passing therethrough from the source of illumination and lens 32 in housing 16 to be directed forwardly parallel to axis A and laterally in a common direction with respect to axis A, as set forth more fully hereinafter. Preferably for this purpose, as best seen in FIGS. 2 and 5, lenticular elements 66 have first surface portions 68 which are planar and parallel to one another and to axis A, and second surface portions 70 which are arcuate and have identical radii of curvature R with respect to corresponding axes 71 perpendicular to axis A. Surfaces 70 extend in the same direction laterally from the corresponding surface 66 and axially toward the outer side of the lens.

The outer side of light directing lens 34 is provided with lenticular elements which direct light beams passing therethrough in laterally opposite directions with respect to axis A and with respect to the common lateral direction provided by lenticular elements 66, as set forth more fully hereinafter. A preferred structure of the lenticular elements on the outer side of lens 34 for this purpose is best seen in FIGS. 1, 2 and 6 of the drawing. In this respect, the outer side of lens 34 is provided with laterally adjacent lenticular elements 72 and 74, the outer surfaces of which are respectively concave and convex with respect to axis A in the direction of light passing through the lens. Lenticular elements 72 and 74 extend uninterruptedly across the outer side of the lens between rim 64 and are parallel to one another and perpendicular to lenticular elements 66. Further, the outer surfaces of lenticular elements 72 and 74 have identical radii of curvature R1 and R2 with respect to corresponding axes 73 and 75, respectively, providing for the outer surface of the lens to be sinusoidal in cross section. Axes 73 and 75 are perpendicular to axis A and to axes 71 of lenticular elements 66.

As mentioned hereinabove, light beams L are directed toward the inner surface of lens 34 by collimating lens 32 in directions parallel to axis A and thus perpendicular to the plane of lens 34. As will become apparent from the following description in conjunction with FIGS. 5, 6 and 7 of the drawing, lenticular elements 66, 72 and 74 cooperate to direct such light beams outwardly of lens 34 to produce a light pattern in the form of a cone having a planar side parallel to axis A and laterally outside of which the light is not visible. With regard first to FIG. 5, light beams from collimating lens 32 first impinge upon lenticular elements 66 and in directions parallel to the lens axis and thus parallel to planar surfaces 68 of lenticular elements 66. Accordingly, those light beams which impinge upon surfaces 70 of lenticular elements 66 at or near planar surfaces 68, such as beams L1 and L2 shown in FIG. 5, pass through the lens and are directed forwardly thereof parallel to axis A and to one another as indicated by light paths P1 and P2. It will be appreciated of course that beams of light similar to beams L1 and L2 impinge upon the lenticular elements 66 along the entire lengths thereof in the direction perpendicular to the plane of FIG. 5, whereby the light emanating along pahts P1 and P2 are in effect planes of light parallel to one another and to the planes of surfaces 68 of lenticular elements 66.

Beams of light impinging upon curved surfaces 70 of lenticular elements 66 between adjacent planar surfaces 68, such as light beam L3 and L4 shown in FIG. 5, are deflected by the corresponding curved surface 70 in a common direction laterally with respect to the lens axis, as indicated by light paths P3 and P4 in FIG. 5. It will be appreciated that light beams corresponding to beams L3 and L4 will impinge upon curved surfaces 70 along the widths thereof between adjacent planar surfaces 68 and along the entire lengths thereof in the direction perpendicular to FIG. 5. Since all of the curved surfaces 70 are of the same orientation with respect to the plane of the lens, it will be appreciated that all such light beams are deflected thereby in the common direction only. With regard to the orientation of lens 34 shown in FIGS. 2 and 5 with respect to horizontal and vertical, it will be appreciated that the planes of light referred to in connection with light paths P1 and P2 are vertical planes. As will become more apparent hereinafter, the plane corresponding to path P2 in FIG. 5 defines a blocking plane, whereby the common direction of deflection of light along paths P3 and P4 is away from the blocking plane. With further regard to the orientation of lens 34 in FIG. 2 whereby lenticular elements 66 extend vertically, it will be appreciated that light beams pass through lenticular elements 66 toward lenticular elements 72 and 74 in a horizontal disposition. In other words, there is no vertical deflection of light beams by lenticular elements 66 oriented as shown in FIGS. 2 and 5.

Referring now in particular to FIG. 6, light beams such as beams L5, L6, L7 and L8 pass through lenticular elements 66 horizontally, impinge upon the curved surfaces of a corresponding one of the lenticular elements 72 and 74 on the outer side of the lens, and are deflected by elements 72 and 74 in laterally opposite directions. These laterally opposite directions are upwardly and downwardly in connection with the lens orientation shown in FIGS. 2, 5 and 6 and, thus, are laterally opposite with respect to the lens axis and with respect to the common horizontal direction of deflection caused by elements 66. More particularly, as will be seen in FIG. 6, light beams L5 and L7 pass through lenticular elements 74 on the outer side of the lens and light beams L6 and L8 pass through lenticular elements 72 on the outer side of the lens. The convex outer surface contours of lenticular elements 74 cause light beams passing therethrough to converge with respect to the axis 74*a* of the corresponding lenticular element, and the concave outer surface contour of lenticular elements 72 cause light beams passing therethrough to diverge with respect to the corresponding lenticular element axis 72*a*. Axes 72*a* and 74*a* are parallel to lens axis A and, accordingly, it will be appreciated that light beams L5, L6, L7 and L8 upon passing through lenticular elements 72 and 74 are deflected upwardly and downwardly relative to horizontal as indicated by the corresponding light paths P5, P6, P7 and P8. Thus, these directions are laterally opposite with respect to the common direction of deflection caused by lenticular elements 66 and are laterally opposite with respect to the lens axis.

With further regard to FIGS. 5 and 6, it will be apparent that light beams L5, L6, L7 and L8 can impinge upon lenticular element 66 at different locations across curved surface 70 thereof, such as at the positions of beam L1, L2, L3 and L4 in FIG. 5. Thus, if light beams L5 and L6 in FIG. 6 are considered to correspond to light beams L1 and L2 in FIG. 5, it will be seen that beams L5 and L6 would pass through the lens parallel to axis A and would be deflected upwardly and downwardly by lenticular elements 72 and 74, whereby the light paths P5 and P6 would be in the vertical planes described above with respect to light paths P1 and P2 of beams L1 and L2. Similarly, if light beams L6 and L7 in FIG. 6 are considered to correspond to light beams L3 and L4 in FIG. 5, it will be seen that beams L6 and L7 would be deflected by lenticular element 66 to pass through the lens along horizontal paths extending laterally in a common direction relative to the lens axis, which is to the left in FIG. 5, and then would be deflected by lenticular elements 72 and 74 in laterally opposite directions with respect to the common direction. In other words, light beam L6 in passing through the lens would be deflected horizontally to the left by lenticular element 66 and thence downwardly to the left relative to horizontal by lenticular element 72, and beam L7 would be deflected horizontally to the left by element 66 and thence upwardly to the left relative to horizontal by lenticular element 74. If the light beams L6 and L7 were to pass horizontally through the lens along axes 72*a* and 74*a* of lenticular elements 72 and 74 it will be appreciated that there would be no deflection of the beams by the latter elements. Thus the beams would stay in the horizontal lateral paths represented by paths P3 and P4 in FIG. 5.

From the foregoing description it will be seen that if lens 34 is oriented for the lenticular elements 66 to extend vertically and the lenticular elements 72 and 74 horizontally, as shown in FIGS. 2, 5 and 6, some light beams passing through lens 34 are directed horizontally forwardly of the lens in vertical planes parallel to the lens axis, some are deflected horizontally of the lens in a common direction relative to the lens axis which is to the left in FIG. 5, and some are deflected upwardly and downwardly relative to the lens axis and either in the vertical planes or along paths extending to the left in FIG. 5. It is to be noted in particular when considering the lenticular elements to be so oriented that there is no deflection of light horizontally of the lens in the direction opposite to the common direction and which opposite direction would be to the right in FIG. 5.

As mentioned hereinabove, lens 34 provides a blocking plane whereby the light passing through the lens is not visible to an observer standing laterally outside the blocking plane. In this respect, again referring to the orientation of the lens with respect to horizontal and vertical as described above, light beams passing through lenticular element 66 of the lens adjacent rim 64 and along the length of the lenticular element adjacent planar surface 68, such as represented by light beam L2, are directed forwardly of the lens parallel to the lens axis and in a vertical plane through light path P2. Additionally, certain of these beams are deflected upwardly and downwardly in this plane as described above. With the lens orientation referred to above, such a light plane would extend vertically. Accordingly, an observer located forwardly of the lens and to the right of the vertical plane with respect to FIG. 5 would not see light emanating from the lens until such time as the observer moved to the left in FIG. 5 for his line of vision to coincide with the vertical plane through light path P2. At the same time, the deflection of light laterally outwardly from the side of the lens opposite the observer, and the deflection of light laterally upwardly and downwardly with respect to the lens axis provides for light emanating from the lens to be visible to an observer from an equivalent observation point which would be on the opposite side or above or below the lens.

In accordance with the preferred embodiment of the invention, the lateral deflection of light by lenticular elements 66, 72 and 74 is a maximum of about 20° with respect to the lens axis. In other words, in connection with the orientation of lens 34 with respect to horizontal and vertical referred to above, lateral light deflection horizontally of the lens by lenticular elements 66 would be at a maximum angle of about 20° with respect to the lens axis, and the vertical upward and downwardly deflection of light by lenticular elements 72 and 74 would likewise be at a maximum angle of about 20° with respect to the lens axis. With further regard to the preferred embodiment, this is achieved with a polycarbonate lens structured as shown in FIGS. 5 and 6 and having the following dimensions with reference to the letter characters in FIGS. 5 and 6.

Figure 7:
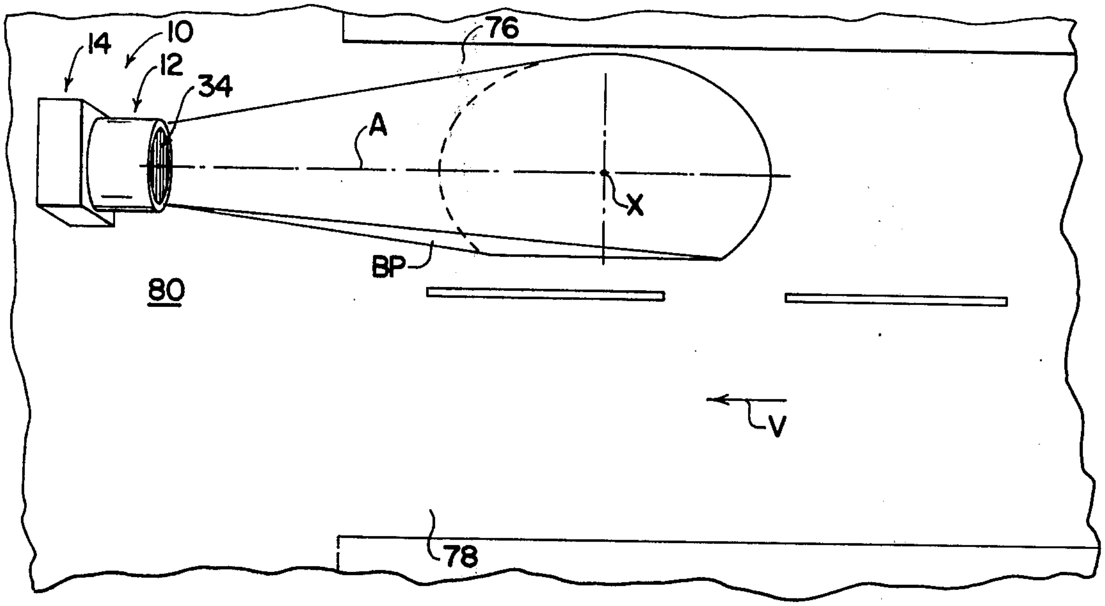
FIG. 7 is a schematic illustration of the pattern of light emanating from the signal device when used in a turn lane at an intersection; and, FIG. 8 is an exploded perspective view of the component parts of the signal device shown in FIG. 1.

H1—0.040 inch
H2—0.067 inch
T—0.125 inch
R—0.215 inch
R1—0.250 inch
R2—0.250 inch
C—0.050 inch
C1—0.183 inch
C2—0.058 inch
D—0.250 inch An application of the controlled light directing capability of a signal device in accordance with the present invention is shown in FIG. 7 of the drawing. In this respect, use of the signal device is schematically illustrated in FIG. 7 in conjunction with a turn lane 76 and an adjacent through lane 78 approaching an intersection 80. The signal device is suitably supported above turn lane 76 with axis A inclined downwardly and for a vertical plane therethrough to be generally parallel to the dividing lane between lanes 76 and 78. Further, the signal device is oriented relative to the support therefor for the lenticular elements on the inner and outer sides of lens 34 to be oriented with respect to horizontal and vertical as described hereinabove in conjunction with the description of FIG. 5 of the drawing. Accordingly, the blocked plane referred to in conjunction with the description of FIG. 5, designated BP in FIG. 7, extends vertically with respect to turn lane 76 and is disposed laterally of axis A in the direction toward through lane 78. Axis A is inclined downwardly to intersect turn lane 76 at point X, and the deflection of light beams by lens 34 upwardly and downwardly relative to axis A and laterally thereof away from plane BP produces a beam of light in the form of a section of a cone impinging on the turn lane. Since blocking plane BP is vertical in connection with such use, the viewing distance for the beam of light in turn lane 76 can be increased by decreasing the angle of incline of axis A and, at the same time, it will be appreciated that the plane BP remains vertical and within the turn lane. Accordingly, the operator of a vehicle in through lane 78 moving towards intersection 80 in the direction of arrow V cannot see and thus is not distracted by the beam of light which is confined to the turn lane.

If lane 76 were a through lane and it was desired, for example, to block visibility of the signal device to an approaching vehicle until the latter has passed through a preceding intersection, such blocking can be achieved merely by rotating the light source and optics portion 12 about axis A to reposition blocking plane BP above axis A and on an incline toward lane 76. Since no light is deflected laterally towards the blocking plane, the beam of light emanating from the signal device would not be visible to the operator of an approaching vehicle until such time as the operator's line of vision passed through the inclined blocking plane.

Figure 8:
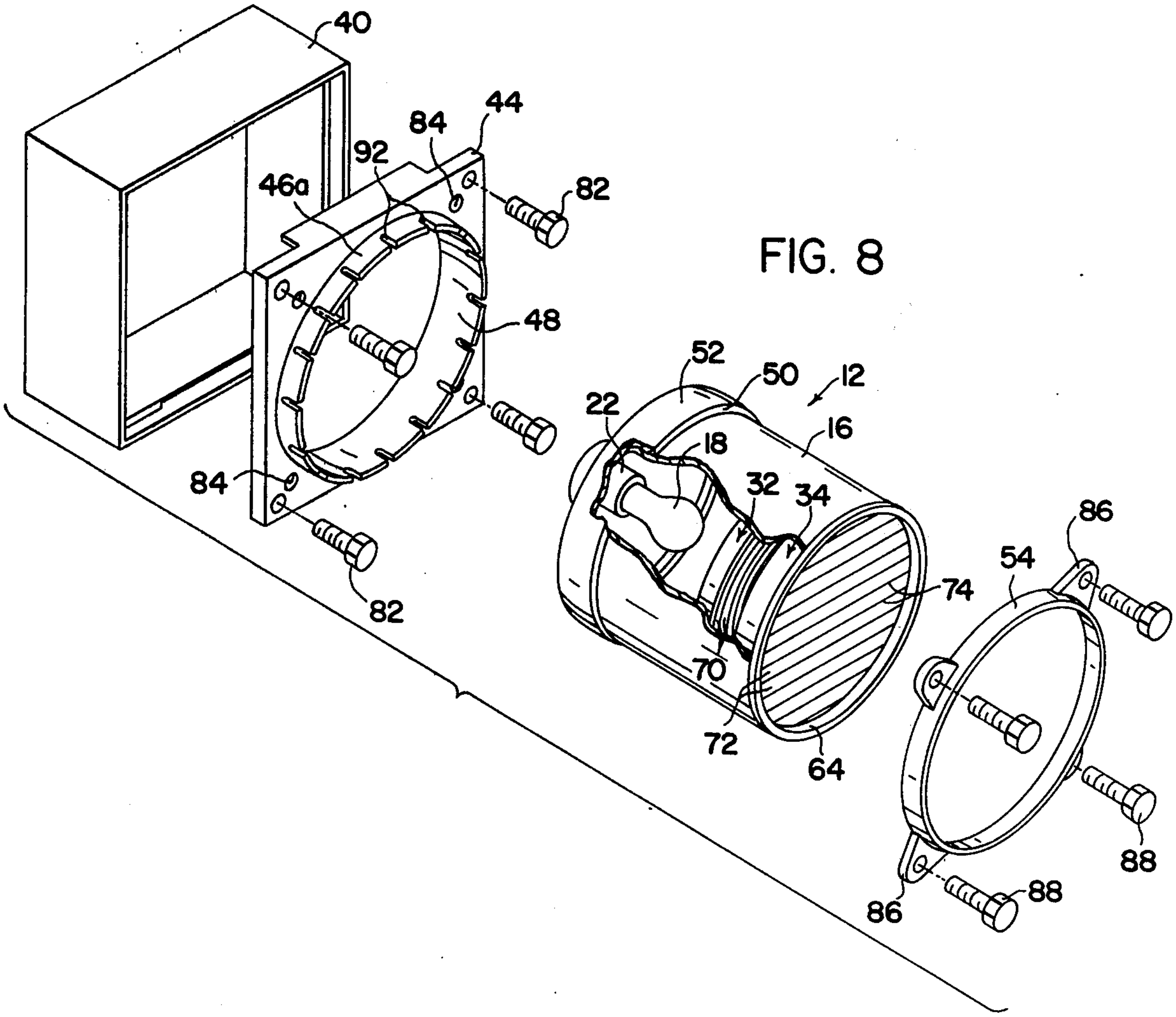

It will be understood from the foregoing description that the light source and optics portion 12 of the signal device can be rotated about axis A, and that axis A can be universally pivoted relative to mounting and support portion 14 to facilitate adjusting the signal device in connection with a particular use thereof. These adjusting capabilities will be appreciated from the description hereinabove of the coupling assembly 42 shown in FIG. 1. In addition to facilitating adjustment of the light source and optics portion 12 of the device, the structure and structural interrelationship between the latter and mounting and supporting portion 14 facilitates the production and assembly of the signal device as well as the disassembly thereof such as for replacement of the light bulb and/or the performance of other maintenance or replacement operations. In this respect, as illustrated in FIG. 8 of the drawing, light source and optics portion 12 and ring 50 can be assembled to provide a unit adapted to be readily mounted on or dismounted from housing 40 by means of retaining ring 54 and either with or without the removal of mounting member 44 from housing 40. More particularly, mounting member 44 is adapted to be removably secured to housing 40 at the open end thereof by means of a plurality of threaded fasteners 82 for which appropriate threaded openings, not shown, are provided within housing 40. Further, mounting member 44 is provided with a plurality of threaded apertures 84 aligned with corresponding apertures wings 86 extending radially from clamping ring 54, whereby the clamping ring is removably mounted on mounting member 44 by means of a plurality of threaded fasteners 88 extending through the apertured wings 86 and into threaded engagement with apertures 84 in the mounting member. As described hereinabove, in connection with FIG. 1, the spherical outer surface 52 of ring member 50 rotatably and pivotally seats against spherical inner surface 48 of flange portion 46 of mounting member 44. Prior to assembly of the component parts shown in FIG. 8, the outer portion **46*a* of flange 46 and thus the corresponding portion of surface 48 extends axially so as to slidably receive ring 50 for surface 52 thereof to seat against the inner portion of spherical surface 48. Upon assembly, the inner surface of retaining ring 54 wedgingly engages the outer surface of flange portion 46*a* to radially constrict portion 46*a* and thus the corresponding portion of inner surface 48 into seating and supporting relationship with respect to spherical surface 52 and ring 50. To facilitate such radial constriction, flange portion 46*a* is provided with a plurality of circumferentially spaced apart axially extending slots 92. Accordingly, it will be appreciated that the removal of retaining ring 54 enables axial separation of light source and optics portion 12** from mounting member 44 and, thus, enables access to light bulb socket 22 to facilitate the removal thereof from reflector 20 for displacement of the bulb. Alternatively, such access can be achieved by removing mounting member 44 from housing 40 without disturbing the interconnection between mounting member 44 and light source and optics portion 12.

While considerable emphasis has been placed herein on the specific structures and structural interrelationships between the component parts of the preferred embodiment of the signal device, it will be appreciated that many changes or modifications can be made therein without departing from the principles of the present invention. In this respect, for example, collimating arrangements other than that provided by a Fresnel lens can be employed, and the light source could for example be provided by a bulb alone, or by a bulb, cap and reflector arrangement instead of the bulb and reflector herein disclosed. Still further, mounting arrangements other than the universal arrangement disclosed herein can be employed, as can other arrangements which would provide for universal adjustment of the device. Other changes and modifications will be obvious upon reading and understanding the description herein of the preferred embodiment and, accordingly, it is to be distinctly understood that the foregoing description matter is to be interpreted as illustrative of the present invention and not as a limitation.

Having thus described the invention, it is claimed:

1. A signal device comprising a housing having outer and inner ends, a light source supported in said housing spaced from said outer end, light directing lens means supported on said outer end of said housing, and light collimating means supported in said housing between said light source and said lens means, said lens means having inner and outer sides with respect to said housing and an axis transverse to said inner and outer sides, first lenticular elements on one of said sides of said lens means and including light directing surfaces, said lens means having an orientation in which said axis is horizontal and said light directing surfaces of said first lenticular elements direct light from said collimating means axially outwardly in vertical planes parallel to one another and to said lens axis and including a light blocking plane horizontally spaced from said axis in one direction, said light directing surfaces of said first lenticular elements in said orientation of said lens means further directing light from said collimating means horizontally away from said blocking plane, and second lenticular elements on the other of said sides of said lens means, said second lenticular elements in said orientation of said lens means having light directing surfaces directing light from said collimating means upwardly and downwardly in said vertical planes and horizontally away from said blocking plane.

2. The signal device according to claim 1, wherein said directions of light horizontally away from said blocking plane and upwardly and downwardly in said vertical planes are each at an angle of about 20° with respect to said lens axis.

3. The signal device according to claim 1, wherein said first lenticular elements are parallel and extend vertically across said one lens side and said second lenticular elements are parallel and extend horizontally across said other lens side.

4. The signal device according to claim 3, wherein said one and other sides of said lens means are respectively said inner and outer sides.

5. The signal device according to claim 4, wherein said light collimating means is a Fresnel lens between said lens means and said light source.

6. The signal device according to claim 1, wherein said light directing surfaces of said first lenticular elements include a vertical first outer surface portion parallel to said lens axis and a vertical second outer surface portion extending horizontally and axially from said first outer surface portion toward the other of said sides of said lens means.

7. The signal device according to claim 6, wherein said second outer surface portion is curved.

8. The signal device according to claim 6, wherein said second outer surface portion directs light horizontally away from said blocking plane at an angle of about 20° with respect to said lens axis.

9. The signal device according to claim 6, wherein said one side of said lens means is said inner side thereof.

10. The signal device according to claim 1, wherein each said first lenticular elements extends vertically across said one side of said lens means, said light directing surfaces of each said first lenticular elements including a convex outer surface portion having a uniform radius of curvature about a vertical axis perpendicular to said lens axis.

11. The signal device according to claim 10, wherein said curvature provides for said first lenticular elements to direct light horizontally away from said blocking plane at an angle of about 20° with respect to said lens axis.

12. The signal device according to claim 11, wherein said one side of said lens means is said inner side thereof.

13. The signal device according to claim 1, wherein said second lenticular elements extend horizontally across said other side of said lens means, adjacent ones of said second lenticular elements having outer surfaces which are alternately convex and concave with respect to said lens axis and provide said light directing surfaces of said second lenticular elements.

14. The signal device according to claim 13, wherein said light directing surfaces of said first lenticular elements include a vertical first outer surface portion parallel to said lens axis and a vertical second outer surface portion extending horizontally and axially from said first outer surface portion toward the other of said sides of said lens means.

15. The signal device according to claim 14, wherein said light collimating means is a Fresnel lens between said lens means and said light source.

16. The signal device according to claim 14, wherein said one and other of said sides of said lens means are respectively said inner and outer sides of said lens means.

17. The signal device according to claim 16, wherein said convex and concave outer surfaces of said second lenticular elements are arcuate and have like radii or curvature about corresponding horizontal axes, and said second outer surface portions of said first lenticular elements are arcuate having like radii of curvature about corresponding vertical axes.

18. The signal device according to claim 17, wherein the curvature of said second surface portions of said first lenticular elements provides for said direction of light horizontally away from said blocking plane to be at an angle of about 20° with respect to said lens axis.

19. The signal device according to claim 18, wherein said curvature of said convex and concave outer surfaces of said second lenticular elements provides for said upwardly and downwardly directions of light to be at an angle of about 20° with respect to said lens axis.

20. The signal device according to claim 19, wherein said light collimating means is a Fresnel lens between said lens means and said light source.

21. The signal device according to claim 20, wherein said light source includes a bulb and concave reflector means mounted in said housing, said reflector means providing a reflecting surface behind said bulb with respect to the direction between said outer and inner ends of said housing.

22. The signal device according to claim 16, wherein said light collimating means is a Fresnel lens between said lens means and said light source, said signal device further comprising mounting means for said housing and means interengaging said housing and said mounting means to support said housing for rotation and for universal pivotal movement relative to said mounting means.

* * * * *